United States Patent [19]

Shih

[11] Patent Number: 5,818,611

[45] Date of Patent: Oct. 6, 1998

[54] SCANNING DEVICE

[75] Inventor: Cader Shih, Kaohsiung, Taiwan

[73] Assignee: Microtek International Inc., Hsinchu, Taiwan

[21] Appl. No.: 718,707

[22] Filed: Sep. 27, 1996

[51] Int. Cl.⁶ ...................................................... H04N 1/04
[52] U.S. Cl. ............................ 358/474; 358/498; 358/487
[58] Field of Search .................................. 358/498, 487, 358/474, 473, 488, 496, 497, 400, 500, 401, 505, 506, 412, 471; 382/312; 271/3.2, 272, 273; 399/16, 17

[56] References Cited

U.S. PATENT DOCUMENTS

| | | | |
|---|---|---|---|
| 5,251,072 | 10/1993 | Fukuoka | 358/487 |
| 5,327,259 | 7/1994 | Furusawa | 358/487 |
| 5,550,650 | 8/1996 | Pan | 358/487 |
| 5,608,537 | 3/1997 | Manabe et al. | 358/487 |
| 5,663,812 | 9/1997 | Pan | 358/498 |
| 5,663,813 | 9/1997 | Pan | 358/498 |

*Primary Examiner*—Edward L. Coles
*Assistant Examiner*—Cheukfan Lee
*Attorney, Agent, or Firm*—Bacon & Thomas, PLLC

[57] ABSTRACT

A scanning device includes a housing, a supporting tray provided in the housing, a first receiving face on the supporting tray for receiving a reflection-type original document to be scanned, a second receiving face on the supporting tray for receiving a transparent original document to be scanned, a mechanism for moving the supporting tray into and out of the housing, and scanning elements provided in the housing and positioned to scan the reflection type and transparent original documents as the supporting tray is moved into or out of the housing. The scanning elements include lamps positioned above and below the supporting tray for uniformly illuminating respective transparent and reflection-type documents positioned on the tray as the tray is moved relative to the lamp.

5 Claims, 4 Drawing Sheets

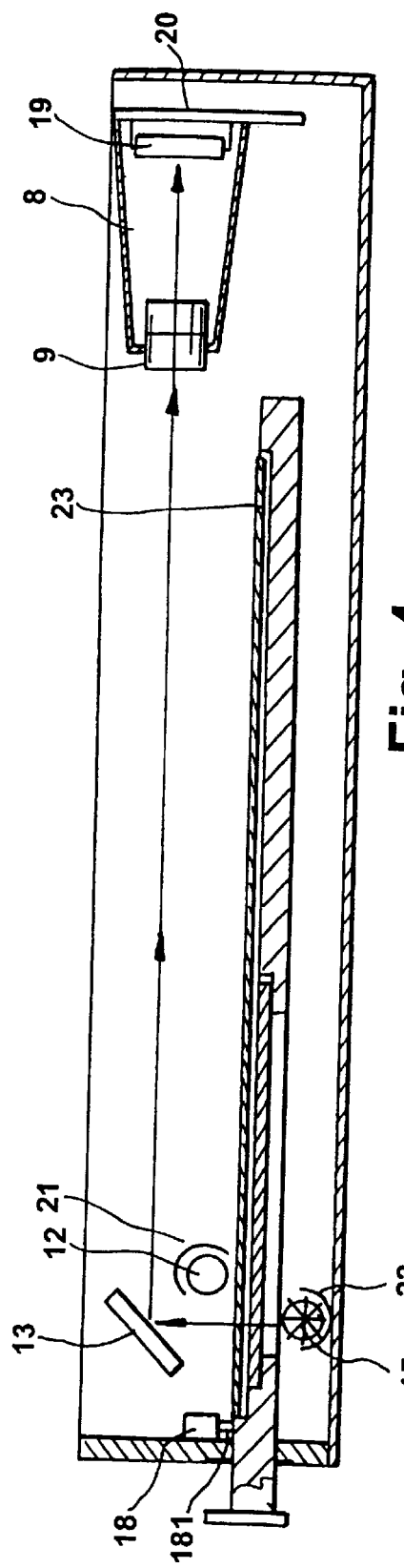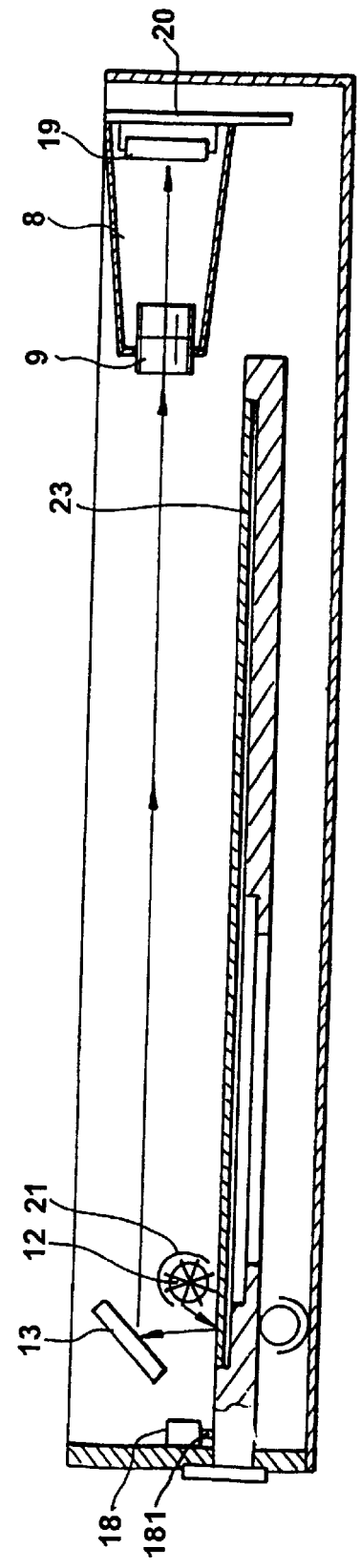

SCANNING DEVICE

BACKGROUND OF THE INVENTION

1. Field of the Invention

This invention relates to an optical scanning device, and in particular to a scanning device capable of scanning both reflective and transparent original documents.

2. Description of Related Art

The importance of scanning devices as peripheral equipment for computers has increased as the widespread popularity of multi-media microcomputer systems has rapidly increased the need for convenient input, processing, and editing of images.

Conventional scanning devices small enough to fit on or within a typical microcomputer and that are therefore especially suitable for use in multi-media microcomputer systems have the disadvantage, however, of requiring discrete point sources of illumination, generally in the form of incandescent bulbs or LEDs, resulting in uneven illumination of the original document during scanning. This problem has heretofore been addressed by providing a complicated illumination-compensation scanning procedure and mechanism, reducing the speed of processing the images.

In addition, conventional scanning devices have generally been limited to only a single scanning function, either scanning by reflective original documents or scanning of transparent original documents. Again, a complicated scanning procedure and mechanism are required to make the conventional scanning device capable not only of scanning a reflection-type original document and, where scanning of transparent original documents is enabled, size constraints have generally limited the type of document to 35 mm slides.

The high cost and/or lack of convenience of these scanning devices, resulting from the need for complicated illumination compensation mechanisms and additional complex mechanisms if multiple scanning functions or original document types are desired, has greatly limited the willingness of the consumers to purchase such devices.

SUMMARY OF THE INVENTION

It is therefore an objective of the present invention to provide a scanning device which can eliminates the disadvantages of conventional scanning devices by providing uniform illumination without the need for complex scanning procedures and mechanisms, and which can not only scan reflective-type original documents, but also can scan a transparent original document.

Another objective of the present invention is to provide a scanning device which is provided with a supporting tray for supporting a variety of original document types, such as photographs, slides, or the like, and which permits easy operation and multifunctional scanning by simply pushing one of two selection buttons on a face panel of the scanning device or through a software control which initiates scanning of either a reflection-type original document or a transparent original document.

It is yet another objective of the present invention to provide a scanning device meeting the above objectives and which is of a shape and of a size similar to that of a 5.25" floppy disk drive, so that the scanning device can be conveniently installed on a personal computer or in the housing of the personal computer so as to save space.

These objectives are achieved, in a preferred embodiment of the invention, by illuminating the documents to be scanned using light tubes which provide even illumination across the width of the document, and by combining the scanning mechanism with a document supporting tray moving mechanism such that the document is scanned as the supporting tray is moved into (or out of) the scanner housing, with one of the light tubes being positioned beneath the tray for scanning transparent documents and the other being positioned above the tray for scanning opaque or reflection-type documents.

The scanning device of the present invention can thus be conveniently used for scanning a variety of original documents, including slides, a 4"×6" or 3"×5" photographs, business cards, identification cards, and numerous other kinds of small documents, so that any computer user, whether a family member, professional, computer expert, police officer in a car, or other person, can input an image of the original document to the computer, enabling easy storage or transmission of photographs and slides in electronic form, increased possibilities for composition and processing of images contained on a variety of documents, efficient arrangement of business cards, verification of identity cards, and numerous other applications previous available only those willing to purchase relatively high cost systems with more limited functionality.

BRIEF DESCRIPTION OF THE DRAWINGS

FIG. 4 is a vertical sectional view showing a path of light when this invention is being used for scanning a transparent original document.

FIG. 5 is a vertical sectional view showing a path of light when this invention is being used for scanning a reflection-type original document.

DETAILED DESCRIPTION OF THE PREFERRED EMBODIMENTS

Figure 1:
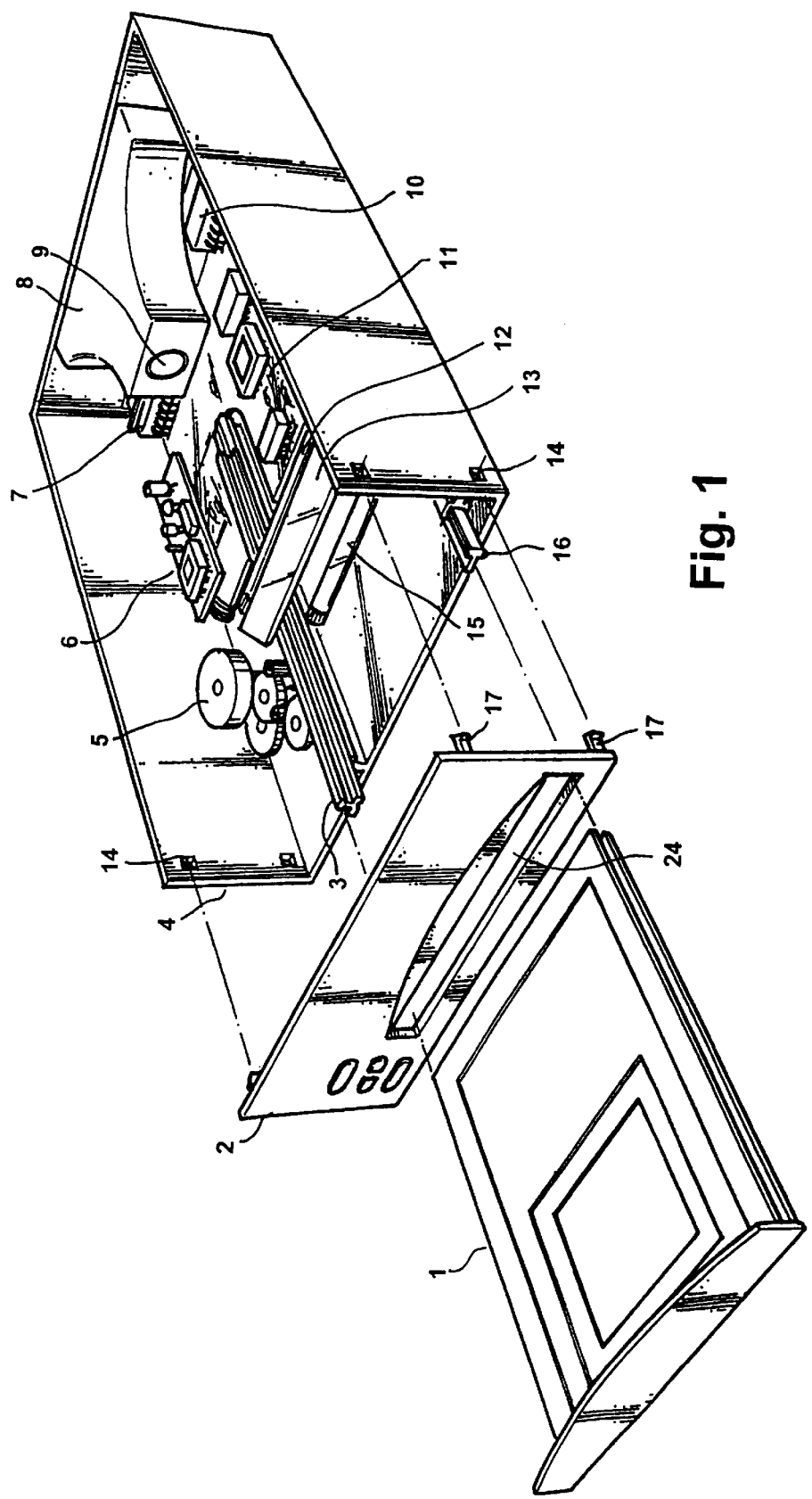
FIG. 1 is an exploded view showing a preferred embodiment of the present invention.
Figure 2:
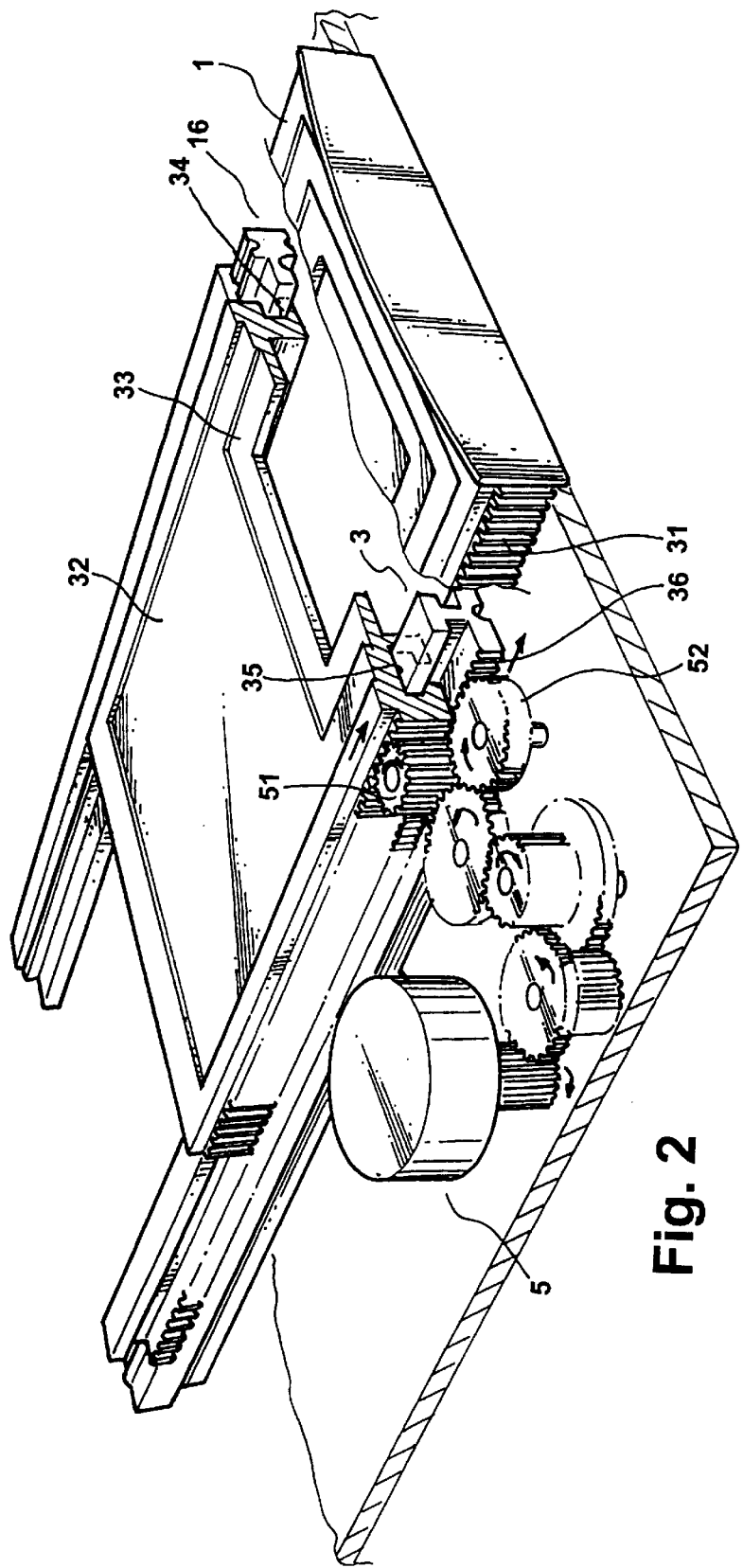
FIG. 2 is a schematic view showing an original document supporting tray for use in the present invention.
Figure 3:
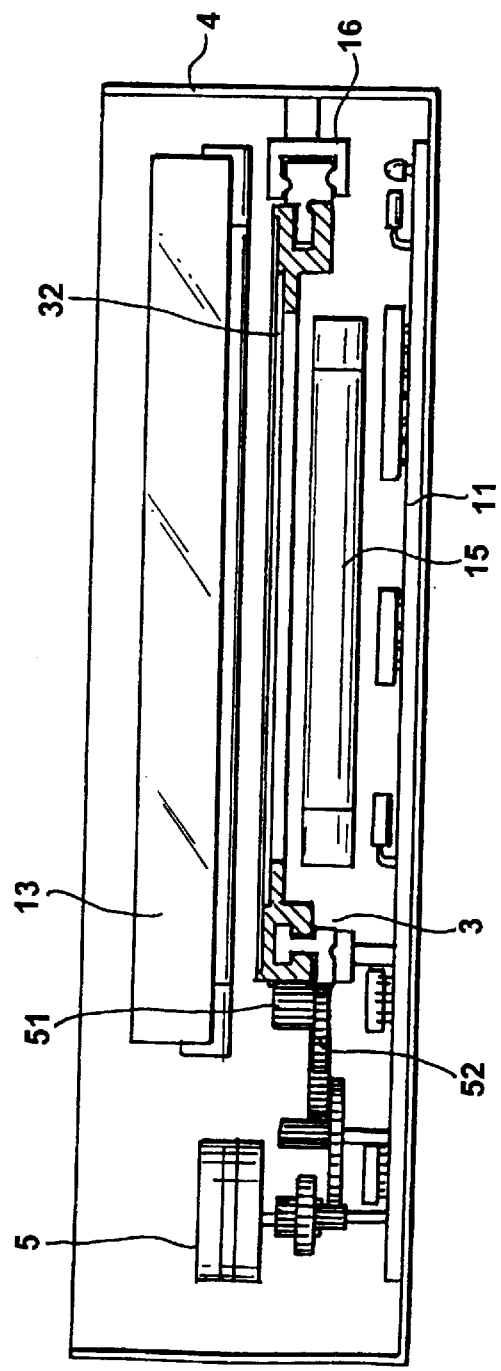
FIG. 3 is a vertical sectional view showing some of the parts shown in FIG. 1.

The scanning device of the present invention includes a housing 4 with a face panel 2, a power source made up of a motor 5, a first speed-reducing gear 51 for receiving a power output from the motor 5, and a second speed-reducing gear 52 for receiving another power output from the motor 5. The housing 4 has a right sliding track 16 and a supporting tray 1 for an original document.

The supporting tray 1 has a first receiving face 32 for receiving an opaque or reflection-type original document to be scanned, and a second receiving face 33 for receiving a transparent original document to be scanned. The supporting tray 1 is positioned in a space formed within the housing 4 and can move towards the outside of the housing 4 upon an instruction or order from a user so that an original document can be placed in the tray prior to scanning or removed from the tray following scanning.

The supporting tray 1 has a right sliding slot 34, a left sliding slot 35, a left sliding track 3, a second rack 31 provided on one side of the left sliding slot 35 for engaging the first speed-reducing gear 51 and being moved thereby, and a first rack 36 provided on the left sliding track 3 for engaging the second speed-reducing gear 52 and being moved thereby. The left sliding slot 35 slidably engages the left sliding track 3 while the right slot 34 supports a right track 16. The left sliding track 3 is for supporting the supporting tray 1 so that the latter is prevented from inclining when the latter moves outwardly. The first speed-reducing gear 51 engages the second speed-reducing gear 52 which has more teeth than the first speed-reducing gear 51 and, as a result, the distance that the left sliding track 3 moves is shorter than the distance that the supporting tray 1 moves.

A scanning mechanism is provided in the housing 4 and includes a dark chamber 8, a lens 9, a cold cathode lamp 15 for a transparent original document, a cold cathode lamp 12 for a reflection-type original document, light shields 22 and 21 for shielding the lamps 15 and 12, respectively, a reflection mirror 13, a light-interrupting circuit 18, a light-interrupting arm 181, a charge-coupled device (CCD) 19, a CCD circuit board 20, and a cover 23 for covering an original document while scanning so that the original will not be incidentally displaced or bent.

A light-tube transformer 6, a power socket 7, and a data transmission port 10 are provided in the housing 4. A plurality of mounting fingers 17 are provided on the inside face of the face panel 2 for engaging a same number of openings 14 on the housing 4 so as to attach the face panel 2 to the housing 4. An opening 24 is provided in the face panel 2 to facilitate insertion of the supporting tray 1 into the inner space of the housing. A board 11 is provided in the housing for supporting electronic parts.

As indicated above, the supporting tray 1 is received in the space formed with the housing 4 and can move toward the outside of the housing 4 upon an instruction from a user so that an original document to be scanned or which has been scanned can be placed onto or removed from the supporting tray 1. In the meantime, scanning is accomplished as the supporting tray 1 having thereon an original to be scanned moves outwardly, as can be readily seen from FIGS. 4 and 5. After scanning has been completed, the original document can be easily removed.

The scanning of two different types of original documents, i.e., transparent and reflection-type original documents, is now described with reference to FIG. 4 and FIG. 5 respectively.

As shown in FIG. 4, a transparent original document, such as a 35 mm slide, is placed on a receiving face 33 and covered with a cover 23 so that the original can be prevented from being bent or incidentally displaced. A push-button for transparent original scanning (not shown in the drawings) is then pushed so that the lamp 15 for the transparent original documents is turned on. The supporting tray 1 is slightly pushed so that the light-interrupting arm 181 leaves the light-interrupting circuit 18 and energizes the motor to cause the supporting tray 1 to enter the housing 4 for scanning, or a scanning-initiating button is pushed to cause the supporting tray can to enter the housing 4 for scanning. The light shield 22 is employed for concentrating the light from the lamp 15.

As shown in FIG. 5, a reflection-type original document, such as a photograph or a card, is placed onto the receiving face 32 and covered with a cover 23 so that the original can be prevented from being bent or incidentally displaced. A push-button for reflection-type scanning (not shown in the drawings) is then pushed so that the lamp 12 for reflection-type original documents can be turned on. The supporting tray 1 is slightly pushed so that the light-interrupting arm 181 closes the light-interrupting circuit 18 and energizes the motor to cause the supporting tray 1 to enter the housing 4 for scanning, or a scanning-initiating button is pushed to cause the supporting tray to enter the housing 4 for scanning. The light shield 21 is employed for concentrating the light from the lamp 12.

The invention thus solve the problem of even illumination of the document to be scanned by using light tubes as the light source and provides for scanning of either opaque of transparent original documents by providing two such light sources, one positioned under the document tray and the other positioned above the document tray, with the document being scanned as the tray moves into (or out of) the housing.

It will of course be appreciated by those skilled in the art that details of the illustrated embodiment may be varied without departing from the scope of the invention, and therefore that the invention should be interpreted solely in accordance with the appended claims.

What is claimed is:

1. A scanning device, comprising a housing; a supporting tray provided in the housing; a first receiving face on the supporting tray for receiving a reflection-type original document to be scanned; a second receiving face on the supporting tray for receiving a transparent original document to be scanned; a mechanism for moving the supporting tray into and out of the housing; and scanning elements provided in the housing and positioned to scan the reflection type and transparent original documents as the supporting tray is moved into or out of the housing;

wherein the mechanism for moving the supporting tray into and out of the housing includes a motor; a first speed-reducing gear for receiving a power output from the motor; a second speed-reducing gear for receiving another power output from the motor; a sliding track for slidably supporting the supporting tray and including a rack engaged with the first speed-reducing gear; and a rack on the supporting tray engaged with the second speed-reducing gear; and wherein the first speed reducing gear engages the second speed reducing gear and has more teeth than the second speed reducing gear to cause the track to be moved at a slower speed than the supporting tray supported by the track as it is moved into and out of the housing.

2. A scanning device as claimed in claim 1, wherein the scanning elements include a lens; a first lamp and a light shield positioned below the scanning tray for scanning a transparent original document; a second lamp and another light shield positioned above the scanning tray for scanning a reflection-type original document; and a scanning mirror arranged to reflect light to a charge-coupled device for capture an image of the scanned document.

3. A scanning device as claimed in claim 1, further comprising a circuit for activating the respective lamps and motor in response to engagement between a light-interrupting are connected to the circuit and a document on the supporting tray as the tray is pushed slightly into the housing with a supporting document thereon.

4. A scanning device as claimed in claim 1, further comprising a cover for covering an original document while scanning so that the original document in not displaced or bent.

5. A scanning device as claimed in claim 1, wherein the mechanism for moving the supporting tray into and out of the housing further includes a right sliding slot for supporting a second track which in turn supports the supporting tray, and a left sliding slot for supporting the track; the second rack being provided on one side of the left sliding slot for engaging the first speed-reducing gear and being moved thereby; and the first rack being provided on the first track for engaging the second speed-reducing gear and being moved thereby.

* * * * *